(12) United States Patent
Ju et al.

(10) Patent No.: US 10,748,294 B2
(45) Date of Patent: Aug. 18, 2020

(54) METHOD, SYSTEM, AND COMPUTER-READABLE RECORDING MEDIUM FOR IMAGE OBJECT TRACKING

(71) Applicant: Wistron Corporation, New Taipei (TW)

(72) Inventors: Ting-Feng Ju, New Taipei (TW); Kuo-Hsien Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 151 days.

(21) Appl. No.: 15/964,076

(22) Filed: Apr. 27, 2018

(65) Prior Publication Data
US 2019/0206065 A1 Jul. 4, 2019

(30) Foreign Application Priority Data
Jan. 4, 2018 (TW) .............................. 107100266 A

(51) Int. Cl.
*G06K 9/00* (2006.01)
*G06T 7/246* (2017.01)
*G06T 7/73* (2017.01)
*G06K 9/32* (2006.01)
(Continued)

(52) U.S. Cl.
CPC ............ *G06T 7/248* (2017.01); *G06K 9/3233* (2013.01); *G06T 7/20* (2013.01); *G06T 7/70* (2017.01); *G06T 7/74* (2017.01); *G06T 2207/10016* (2013.01); *G06T 2207/20004* (2013.01)

(58) Field of Classification Search
CPC ........ G06K 9/3233; G06T 2207/10016; G06T 2207/20004; G06T 7/20; G06T 7/248; G06T 7/70; G06T 7/74
See application file for complete search history.

(56) References Cited

U.S. PATENT DOCUMENTS

| 9,390,506 B1* | 7/2016 | Asvatha Narayanan ..................... G06T 7/194 |
| 2013/0208943 A1* | 8/2013 | Chuang ................... G06T 7/246 382/103 |
| 2016/0267325 A1* | 9/2016 | Sundaresan ........ G06K 9/00624 |

FOREIGN PATENT DOCUMENTS

TW I509568 11/2015

OTHER PUBLICATIONS

"Office Action of Taiwan Counterpart Application", dated Nov. 7, 2018, p. 1-p. 23.

* cited by examiner

*Primary Examiner* — Xin Jia
(74) *Attorney, Agent, or Firm* — JCIPRNET

(57) ABSTRACT

A method, a system, and a computer-readable recording medium for image object tracking are provided. A video stream including a previous frame and a current frame is received, wherein the video stream is generated through photographing a space including a moving object by an image capturing device. A moving posture of the moving object determined according to the previous frame is obtained. Whether the moving posture of the moving object is a movement along a first direction or a movement along a second direction is determined. One of different tracking algorithms is selected for performing object tracking according to whether the moving posture of the moving object is the movement along the first direction or the movement along the second direction, to obtain an object feature region associated with the moving object in the current frame. The moving object in the space is tracked according to the object feature region.

22 Claims, 12 Drawing Sheets

(51) Int. Cl.
*G06T 7/20* (2017.01)
*G06T 7/70* (2017.01)

METHOD, SYSTEM, AND COMPUTER-READABLE RECORDING MEDIUM FOR IMAGE OBJECT TRACKING

CROSS-REFERENCE TO RELATED APPLICATION

This application claims the priority benefit of Taiwan application serial no. 107100266, filed on Jan. 4, 2018. The entirety of the above-mentioned patent application is hereby incorporated by reference herein and made a part of this specification.

BACKGROUND

Technical Field

The disclosure relates to a technique of detecting moving objects, and in particular, to an image object tracking method, and a system and a computer-readable recording medium thereof that constantly detect and track an object even when a direction of movement or a posture of the object is changed.

Description of Related Art

As technology advances, visual monitoring apparatuses have been developed to exhibit great application potentials, and video image detection techniques have been widely applied to various applications of recognizing and tracking moving objects in real world. Specifically, object tracking algorithms based on image processing are indispensable core techniques in visual monitoring systems. By using object tracking algorithms based on image processing, a visual monitoring system can analyze video images to estimate positions and movement statuses of tracked objects in a monitored environment.

However, in different monitored environments and scenarios, properties, forms, and movement tendencies of the tracked object as well as types of the monitored environment all vary. Therefore, an algorithm designer generally designs a more suitable algorithm process according to the monitored environment and scenario to more accurately and efficiently detect and track objects of interest to a watcher. Currently, the common object tracking algorithms mostly involve tracking objects in an image through image feature extraction and image feature comparison. However, for a tracked object having greater formal variations, its image feature presented in each frame may significantly differ due to changes in the direction of movement or the posture of the tracked object. Therefore, the image feature of the tracked object on the frame may be insufficient for performing accurate feature comparison due to factors such as posture changes and photographing angles. In that case, if the tracked object having greater formal variations is tracked simply based on the image feature, there is a great chance of losing track of the object. Accordingly, how to enhance tracking precision of tracked objects having greater formal variations is one of the issues that attract attention from people skilled in the art.

SUMMARY

Accordingly, the embodiments of the disclosure provide an image object tracking method and a system and a computer-readable recording medium thereof that accurately and efficiently track a moving object having greater formal variations by selecting an adequate tracking algorithm according to a moving posture of the moving object.

In an embodiment of the disclosure, the image object tracking method is used to track a moving object, and the method includes steps below: receiving a video stream including a previous frame and a current frame, wherein the video stream is generated through photographing a space including a moving object by an image capturing device; obtaining a moving posture of the moving object determined according to the previous frame; determining whether the moving posture of the moving object is a movement along a first direction or a movement along a second direction; selecting either a first tracking algorithm or a second tracking algorithm for performing object tracking according to whether the moving posture of the moving object is the movement along the first direction or the movement along the second direction, to obtain an object feature region associated with the moving object in the current frame; and tracking the moving object in the space according to the object feature region.

In an embodiment of the disclosure, the image object tracking system includes an image capturing device, a storage device, and a processor, wherein the processor is coupled to the image capturing device and the storage device. The image capturing device is configured to photograph a space including a moving object to generate a video stream. The storage device is configured to store data. The processor is configured to execute steps below: receiving the video stream including a previous frame and a current frame; obtaining a moving posture of the moving object determined according to the previous frame; determining whether the moving posture of the moving object is a movement along a first direction or a movement along a second direction; selecting either a first tracking algorithm or a second tracking algorithm for performing object tracking according to whether the moving posture of the moving object is the movement along the first direction or the movement along the second direction, to obtain an object feature region associated with the moving object in the current frame; and tracking the moving object in the space according to the object feature region.

In an embodiment of the disclosure, the computer-readable recording medium records computer programs and is loaded by a processor of the image object tracking system to execute the foregoing steps of the image object tracking method.

Accordingly, in the embodiments of the disclosure, by determining the moving posture of the moving object in real time, the image object tracking system may select different tracking algorithms based on the different moving postures. Therefore, in an application environment of tracking a moving object having significant postural variations, the embodiments of the disclosure provide object tracking results with high precision.

To provide a further understanding of the aforementioned and other features and advantages of the disclosure, exemplary embodiments, together with the reference drawings, are described in detail below.

DESCRIPTION OF THE EMBODIMENTS

Figure 1:
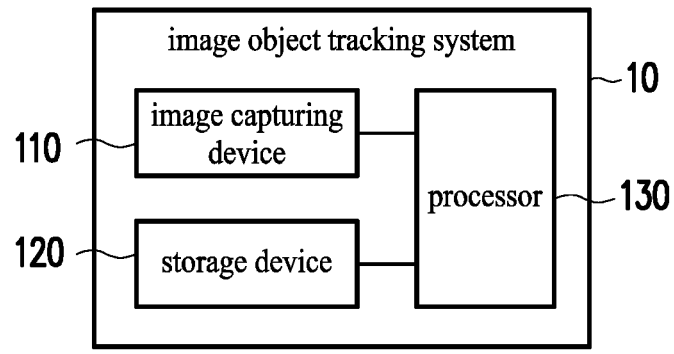
FIG. 1 is a block diagram illustrating an image object tracking system according to an embodiment of the disclosure.

Some embodiments of the disclosure will next be detailed with reference to the accompanying drawings. The reference numerals used in the description below will be seen as referring to the same or similar components when the same reference numerals appear in different drawings. The embodiments only form part of the disclosure and do not disclose all of the embodiments that can be implemented by the disclosure. More specifically, the embodiments are only examples of a method, a system, and a computer-readable recording medium for image object tracking in the claims of the disclosure.

FIG. 1 is a block diagram illustrating an image object tracking system according to an embodiment of the disclosure, which is merely meant to facilitate illustration and is not meant to limit the disclosure. First, FIG. 1 introduces all components of the image object tracking system and their configuration relations. Their detailed functions and operations will be disclosed with reference to FIG. 2 and FIG. 3.

Referring to FIG. 1, an image object tracking system 10 includes an image capturing device 110, a storage device 120, and a processor 130, wherein the processor 130 is coupled to the image capturing device 110 and the storage device 120. In an embodiment, the image object tracking system 10 includes a computer system including the storage device 120 and the processor 130, and the image capturing device 110 externally connected to the computer system. For example, the image object tracking system 10 may be formed of a laptop or a desktop computer and an external video camera, but the disclosure is not limited hereto. In another embodiment, the image object tracking system 10 may integrate the image capturing device 110, the storage device 120, and the processor 130 into one single electronic device. For example, the image object tracking system 10 may be implemented as an electronic device having an image capturing function, such as a smartphone, a tablet computer, etc., but the disclosure is not limited hereto.

The image capturing device 110 is configured to capture images of a space to generate a video stream and includes an imaging lens having a lens and a photosensitive device. The photosensitive device is configured to sense intensity of light entering the lens and further generate an image. The photosensitive device is, for example, a charge coupled device (CCD), a complementary metal-oxide semiconductor (CMOS) device, or another device, and the disclosure is not limited hereto.

The storage device 120 is configured to store data such as images and program codes, and is, for example, a fixed or movable random access memory (RAM), read-only memory (ROM), flash memory, hard disk of any form, or another similar device, integrated circuit, or a combination thereof.

The processor 130 is configured to control actuations between the components of the image object tracking system 10, and is, for example, a central processing unit (CPU) or another programmable general-purpose or specific-purpose microprocessor, digital signal processor (DSP), programmable controller, application specific integrated circuit (ASIC), programmable logic device (PLD), another similar device, or a combination of these devices.

Figure 2:
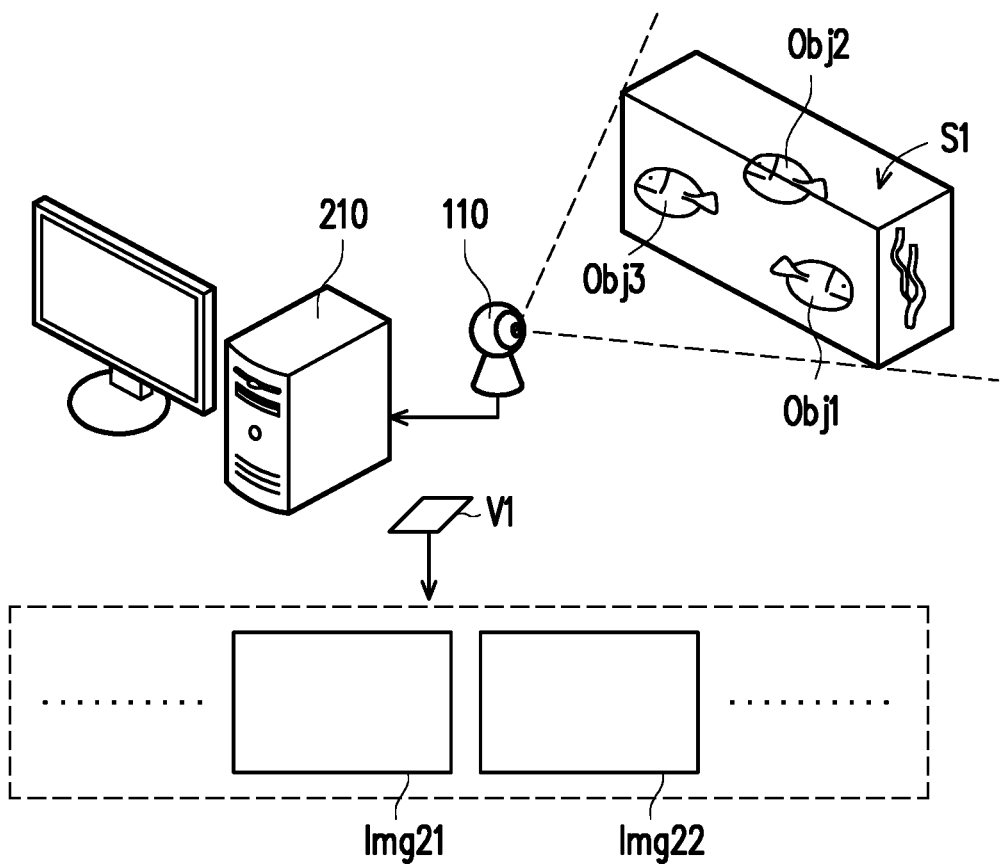
FIG. 2 is a schematic diagram illustrating a scenario of an image object tracking system according to an embodiment of the disclosure.

FIG. 2 is a schematic diagram illustrating a scenario of an image object tracking system according to an embodiment of the disclosure. In the example of FIG. 2, a monitored space 51 is an internal space of an aquarium, and moving objects Obj1 to Obj3 been tracked are fishes kept in the aquarium. The image capturing device 110 is installed at a fixed position and constantly photographs the aquarium to generate a video stream V1. The image capturing device 110 provides the video stream V1 to a computer system 210 formed of the processor 130 and the storage device 120. The video stream V1 includes a plurality of frames, e.g., a frame Img21 and a frame Img22, respectively corresponding to different time points. Therefore, in the embodiments of the disclosure, through analyzing the video stream V1, movement statuses and positions of the fish (i.e., the moving objects Obj1 to Obj3) in the aquarium can be tracked. However, the example of FIG. 2 and the embodiments below will be illustrated with fish in an aquarium as the moving objects, but the disclosure is not limited hereto. In other embodiments, the moving objects may also be live creatures of other species or non-live-creatures.

In the example where the moving object is a fish, when the image capturing device 110 photographs a display side of the aquarium, if a moving posture of the fish is a horizontal (leftward-rightward) movement, the image capturing device 110 can capture sufficient image features of the fish. On the other hand, if the moving posture of the fish is a perpendicular (forward-backward) movement, the image capturing device 110 cannot capture sufficient image features of the fish. Accordingly, in the embodiments of the disclosure, the moving posture of the fish is detected in real time and classified as a movement along a specific direction, so that an adequate tracking algorithm can be selected based on the moving posture of the fish to track the fish in the video stream.

Figure 3:
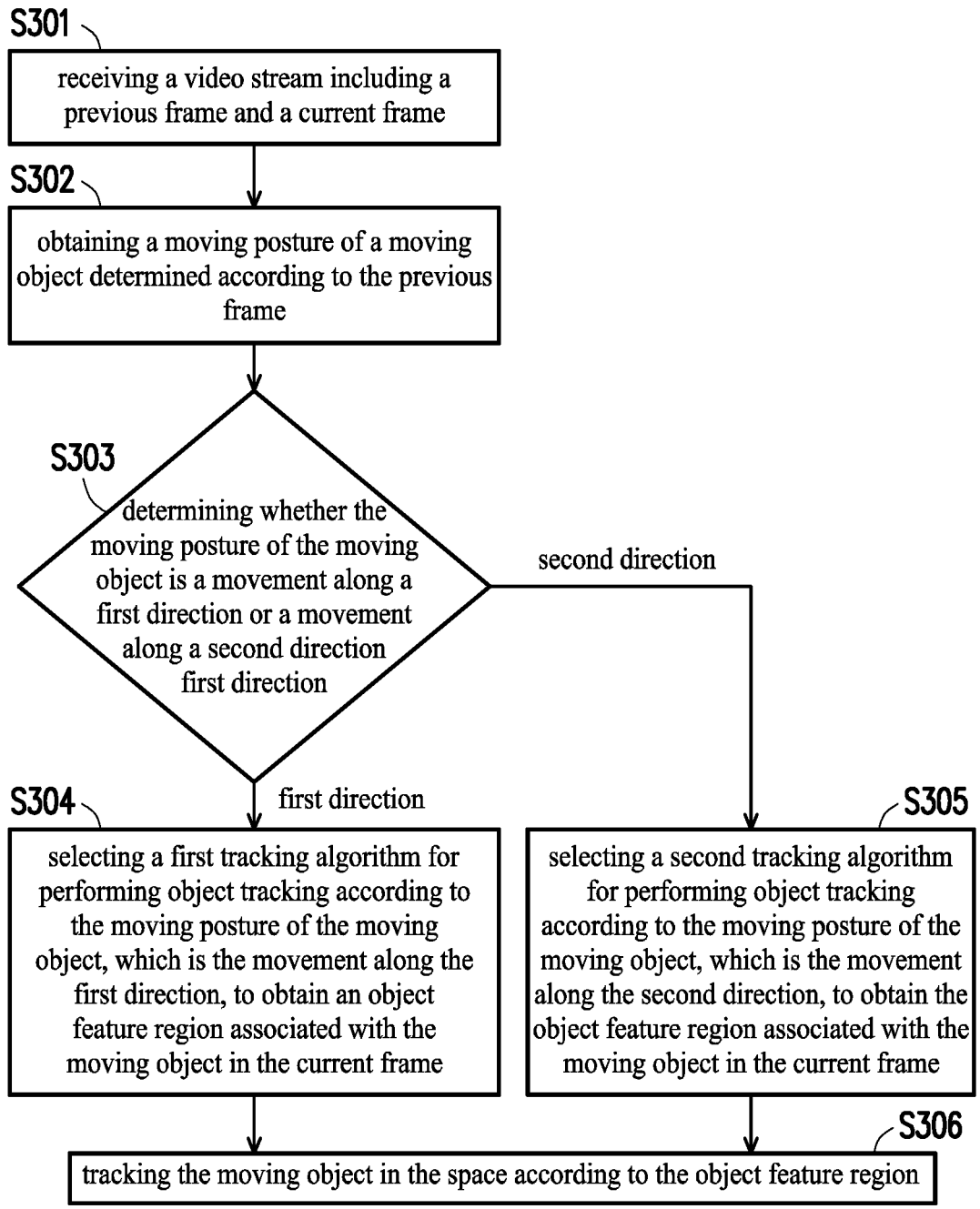
FIG. 3 is a flowchart illustrating an image object tracking method according to an embodiment of the disclosure.

Embodiments will be provided below with reference to the components of the image object tracking system 10 of FIG. 1 to describe detailed steps of the image object tracking system 10 executing the image object tracking method thereof. FIG. 3 is a flowchart illustrating an image object tracking method according to an embodiment of the disclosure. Please refer to FIG. 1 and FIG. 3 at the same time.

First, in step S301, the processor 130 receives a video stream including a previous frame and a current frame. Here, the video stream is generated through photographing a space by the image capturing device 110, and at least one moving object is located in the space. The previous frame and the current frame are images that correspond to different time points but both record the moving object. The current frame is the image currently analyzed by the processor 130.

In step S302, when the processor 130 analyzes the current frame, the processor 130 obtains a moving posture of the moving object determined according to the previous frame. In step S303, the processor 130 determines whether the moving posture of the moving object is a movement along a first direction or a movement along a second direction.

Specifically, in the embodiments of the disclosure, the processor 130 recognizes the moving posture of the moving object in each frame by analyzing each frame in the video stream in real time. Here, the moving posture of the moving object is recorded as an index tag, for example. Whenever the processor 130 analyzes the current frame, the processor 130 obtains the moving posture of the moving object recognized in the previous frame (i.e., the one frame previous to the current frame) by reading the index tag. Afterwards, the processor 130 determines whether the moving posture of the moving object in the previous one frame is classified as the movement along the first direction or the movement along the second direction.

Figure 4A:
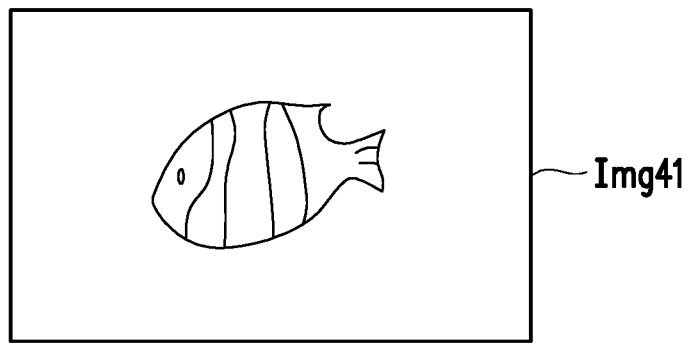
FIG. 4A is a schematic diagram illustrating a frame captured when a fish moves along a first direction.
Figure 4B:
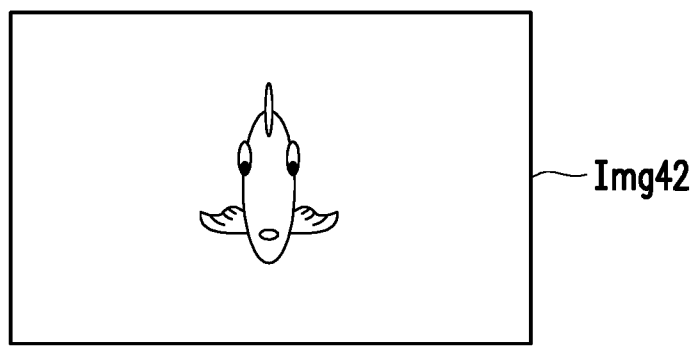
FIG. 4B is a schematic diagram illustrating a frame captured when a fish moves along a second direction.

In the embodiments of the disclosure, in the example where the moving object is a fish, the movement along the first direction means that the fish moves leftwards and rightwards relatively to the image capturing device 110, and the movement along the second direction means that the fish moves forwards and backwards relatively to the image capturing device 110. For example, FIG. 4A is a schematic diagram illustrating a frame captured when the fish moves along the first direction. FIG. 4B is a schematic diagram illustrating a frame captured when the fish moves along the second direction. When the moving posture of the fish is the movement along the first direction, the image capturing device 110 captures a frame Img41 and obtains a complete feature of the fish. When the moving posture of the fish is the movement along the second direction, the image capturing device 110 captures a frame Img42 and cannot obtain a complete feature of the fish.

Accordingly, if the moving posture of the moving object is the movement along the first direction, in step S304, the processor 130 selects a first tracking algorithm for performing object tracking according to the moving posture of the moving object, which is the movement along the first direction, to obtain an object feature region (generally referred to as a region of interest (ROI)) associated with the moving object in the current frame. On the other hand, if the moving posture of the moving object is the movement along the second direction, in step S305, the processor 130 selects a second tracking algorithm for performing object tracking according to the moving posture of the moving object, which is the movement along the second direction, to obtain the object feature region associated with the moving object in the current frame. It is noted that the first tracking algorithm is different from the second tracking algorithm.

In the embodiments of the disclosure, the object feature region (i.e., the ROI) is mainly configured to mark a representative range of the moving object, and tracking of the moving object is completed by constantly positioning the object feature region in each frame. A size of the object feature region is at least great enough to enclose the corresponding moving object, and image information in the object feature region is configured to represent the image feature of the moving object.

In the embodiments of the disclosure, the processor 130 selects the corresponding tracking algorithm based on the moving posture of the moving object to position the object feature region in each frame. In other words, in response to changes in the moving posture of the moving object, the object feature regions associated with the moving object in the frames may be marked and positioned according to different tracking algorithms. Specifically, the processor 130 selects the first tracking algorithm for performing image feature comparison to obtain the object feature region associated with the moving object in the current frame. Alternatively, the processor 130 selects the second tracking algorithm for calculating a motion vector of the moving object to obtain the object feature region associated with the moving object in the current frame.

In the embodiments of the disclosure, the first tracking algorithm is an algorithm for performing image object tracking according to the image features in the ROI, such as Circulant Structure Kernel (CSK) and Kernelized Correlation Filter tracker (KCF tracker). The second tracking algorithm is an algorithm for performing image object tracking by calculating the motion vector of the moving object. Therefore, when tracking a moving object having significant postural variations, the present embodiment uses the second tracking algorithm to compensate for a disadvantage of the first tracking algorithm that the image features are not sufficient and may result in an inaccurate tracking result.

Lastly, in step S306, the processor 130 tracks the moving object in the space according to the object feature region. Specifically, by obtaining the object feature region associated with the moving object in each frame, movement statuses and positions of the moving object can be estimated according to the positions of the object feature regions corresponding to different time points, such that a watcher can achieve the purpose of monitoring and tracking the moving object. It is noted that after obtaining the object feature region associated with the moving object in each frame, individual information fields of the moving object may be added to the images of the video stream according to the positions of the object feature region. Therefore, when the watcher views the processed video, the information fields of the moving object in the image constantly follow the moving object in the image.

Figure 5A:
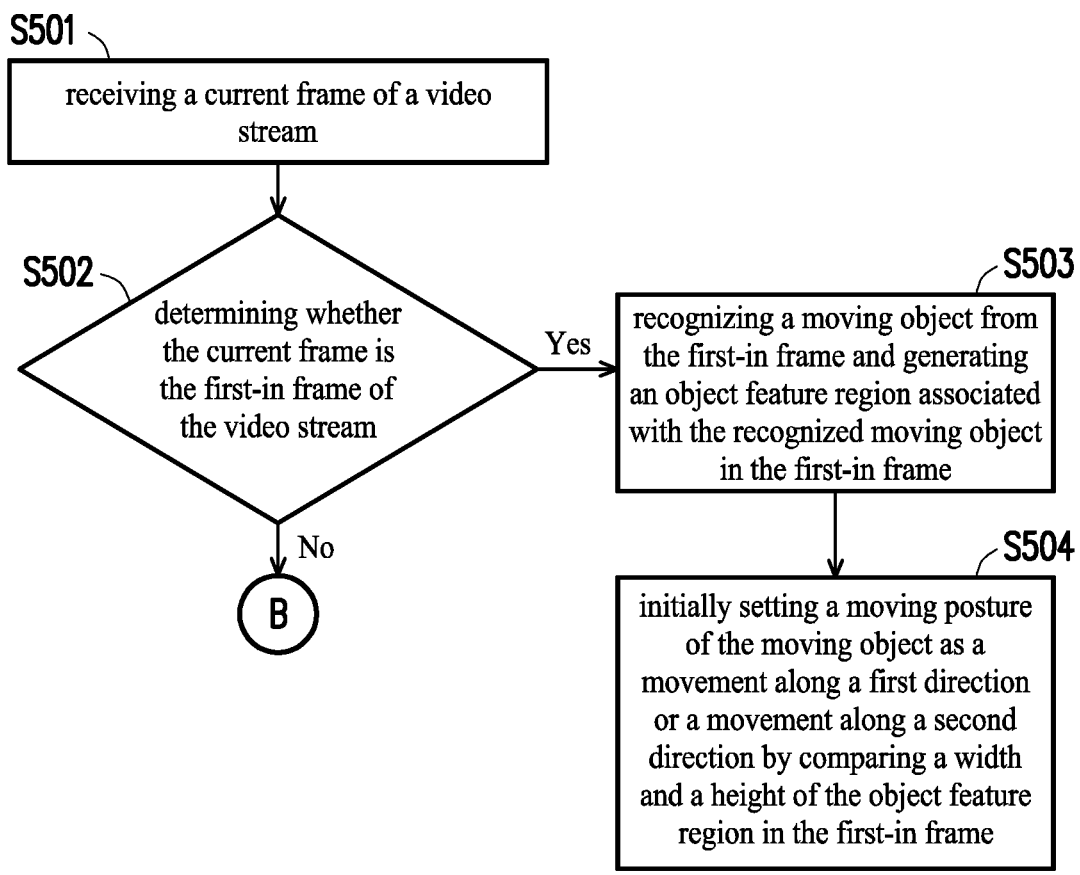
FIG. 5A to FIG. 5C are flowcharts illustrating an image object tracking method according to an embodiment of the disclosure.
Figure 5B:
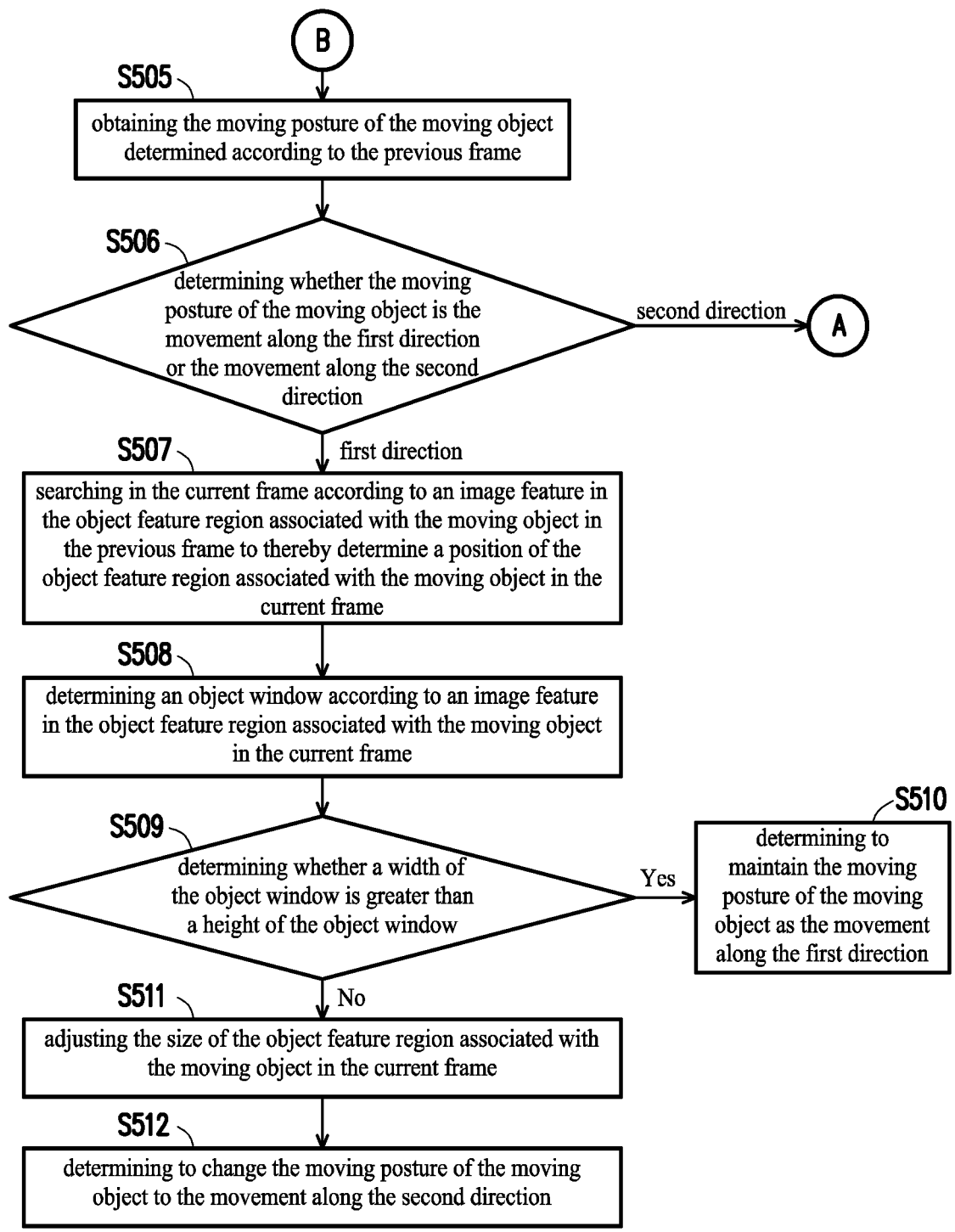
Figure 5C:
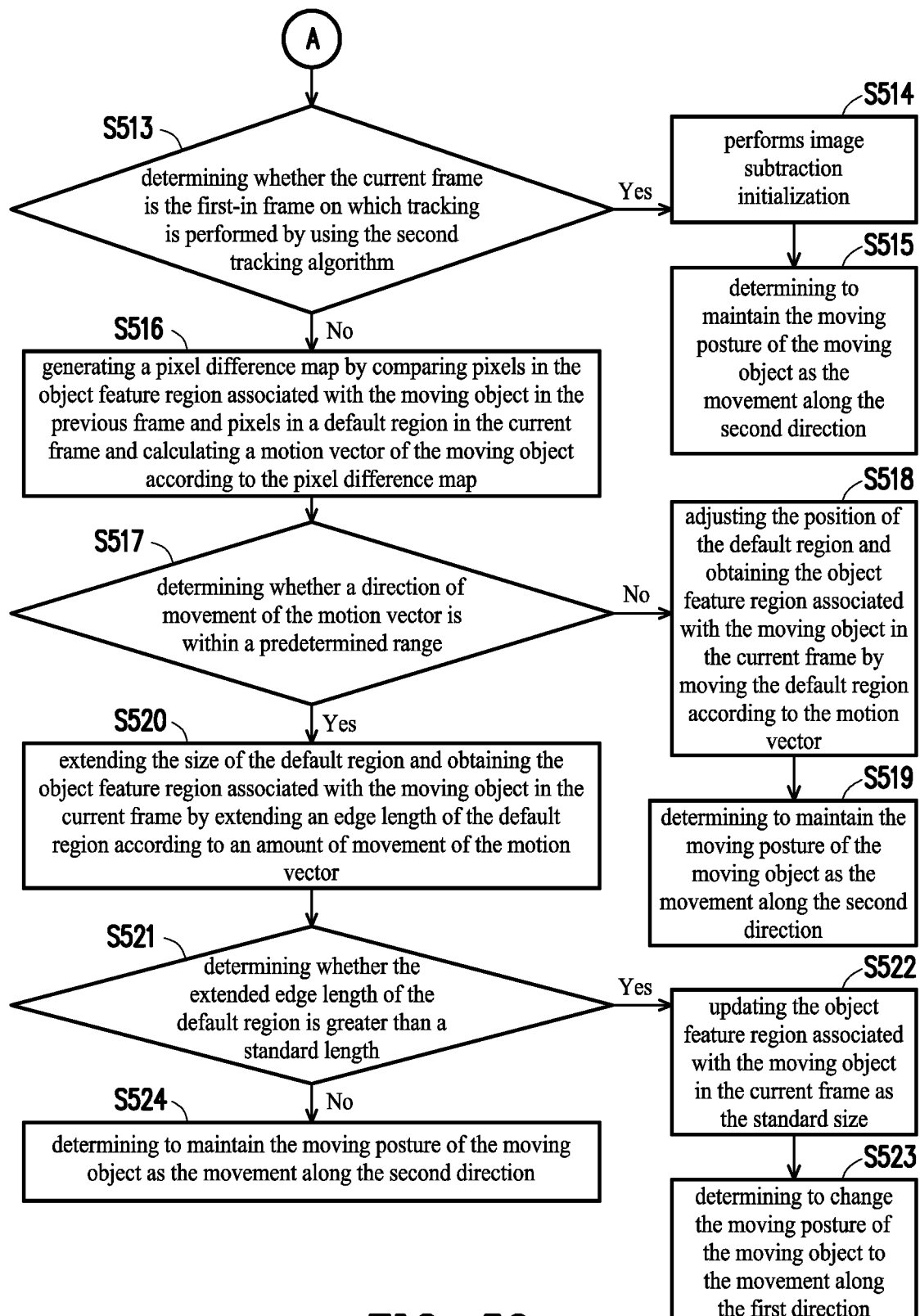

To more clearly illustrate how to determine the moving posture of the moving object and how to determine an adequate object feature region, embodiments will be provided below with reference to the components of the image object tracking system 10 of FIG. 1 to describe the detailed steps of the image object tracking system 10 executing the image object tracking method thereof. FIG. 5A to FIG. 5C are flowcharts illustrating an image object tracking method according to an embodiment of the disclosure. Please refer to FIG. 1 and FIG. 5A to FIG. 5C at the same time.

Referring to FIG. 5A first, in step S501, the processor 130 receives a current frame of a video stream. In step S502, the processor 130 determines whether the current frame is the first-in frame of the video stream. Specifically, the video stream is formed of a plurality of frames having frame numbers, and the frames are sequentially numbered according to a sequence in which they are recorded. Accordingly, the processor 130 can recognize whether the current frame that is currently analyzed is the first-in frame in the video stream according to the frame number, and the first-in frame is, for example, the first-in frame in the video stream that was captured the earliest.

If the determination in step S502 is affirmative, in step S503, the processor 130 recognizes a moving object from the first-in frame and generates an object feature region associated with the moving object in the first-in frame. Next, in step S504, the processor 130 initially sets a moving posture of the moving object as a movement along a first direction or a movement along a second direction by comparing a width and a height of the object feature region in the first-in frame.

Specifically, the processor 130 recognizes the moving object from the first-in frame through a foreground-background separation method or by searching in the frame with a classifier. When the foreground-background separation method is used, according to background subtraction, the processor 130 subtracts a background image from the first-in frame to obtain a foreground (i.e., the moving object). When a classifier is used to recognize the moving object, the classifier used by the processor 130 is, for example, a support vector machine (SVM) classifier or a deep learning framework classifier. After inputting sample images of the moving object to train the classifier, the classifier can recognize the moving object from the first-in frame.

Figure 6:
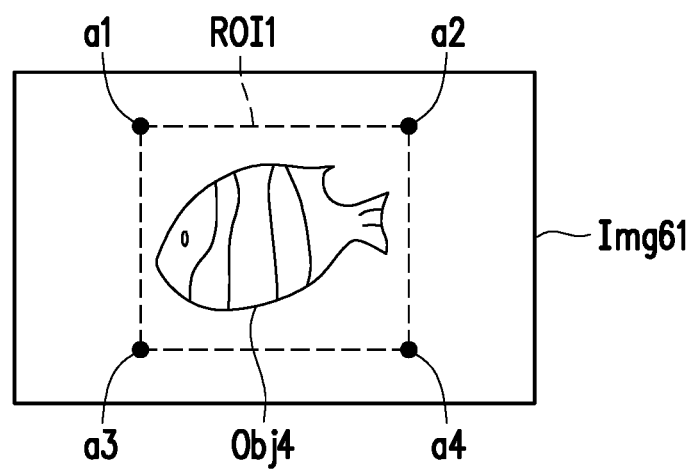
FIG. 6 is a schematic diagram illustrating an example of an object feature region.

Next, after recognizing the moving object in the first-in frame, the processor 130 defines an object feature region (i.e., an ROI) of the moving object and a standard size of the moving object. It is noted that when the first-in frame is analyzed, the processor 130 automatically generates an object feature region at least great enough to enclose the moving object after recognizing the moving object, and the object feature region of the moving object is determined based on a peripheral contour of the detected moving object. For example, FIG. 6 is a schematic diagram illustrating an example of an object feature region. Referring to FIG. 6, the processor 130 determines four pairs of vertex coordinates a1 to a4 according to a peripheral contour of a recognized moving object obj4 to obtain a rectangular object feature region ROI1 formed by the four pairs of vertex coordinates a1 to a4.

Moreover, in the example where the moving object is a fish, when the classifier is used to recognize the fish, since the species of the fish is known, the standard size corresponding to the fish can be directly defined as a default size corresponding to the fish species. When the fish is recognized by using the foreground-background separation method, since the species of the fish is unknown, the standard size corresponding to the fish can be determined according to the object feature region. In an exemplary embodiment, Table 1 shows exemplary calculations for determining the standard size corresponding to the fish based on different object recognition methods.

TABLE 1

| Foreground-background separation method | Classifier |
|---|---|
| When a width of the object feature region is greater than a height:<br>Standard size = size of object feature region<br>When a width of the object feature region is smaller than a height:<br>Height of standard size = height of object feature region Formula (1)<br>Width of standard size = width of object feature region * adjustment coefficient Formula (2) | Standard size = default size of fish species |

In the example where the moving object is a fish, since the form of the fish has its specific pattern, a swimming direction of the fish can be determined by comparing the width and the height of the object feature region. In the embodiments of the disclosure, when the width of the object feature region associated with the fish in the first-in frame is greater than the height, it means that the fish swims leftwards or rightwards relatively to the image capturing device 110. When the width of the object feature region associated with the fish in the first-in frame is smaller than the height, it means that the fish swims forwards or backwards relatively to the image capturing device 110. Therefore, if the processor 130 determines that the width of the object feature region associated with the fish in the first-in frame is greater than the height, the processor 130 sets the standard size to be equal to the size of the object feature region and initially sets the moving posture of the fish as the movement along the first direction. If the processor 130 determines that the width of the object feature region associated with the fish in the first-in frame is smaller than the height, the processor 130 initially sets the moving posture of the fish as the movement along the second direction and calculates the standard size according to Formula (1) and Formula (2) in Table 1. Based on general contour postures of fish, the adjustment coefficient in Formula (2) may be 1.5 to 2.

In the embodiments of the disclosure, when the processor 130 finishes analyzing the first-in frame, the standard size of the moving object, the initial object feature region, and the moving posture of the moving object are all generated according to the description above and recorded in the storage device 120.

Referring to FIG. 5B, if the determination in step S502 is negative, in step S505, the processor 130 obtains the moving posture of the moving object determined according to the previous frame. In step S506, the processor 130 determines whether the moving posture of the moving object is the movement along the first direction or the movement along the second direction. After step S506, the processor 130 selects either a first tracking algorithm or a second tracking algorithm for performing object tracking according to whether the moving posture of the moving object is the movement along the first direction or the movement along the second direction.

When the processor 130 determines that the moving posture of moving object is the movement along the first direction (namely, the moving posture determined according to the previous frame is the movement along the first direction), in step S507, the processor 130 searches in the current frame according to an image feature in the object feature region associated with the moving object in the previous frame to thereby determine a position of the object feature region associated with the moving object in the current frame. For example, by using the KCF tracker, the processor 130 finds a region having a pattern of highest similarity in the current frame according to a pattern in the object feature region in the previous frame to define the object feature region in the current frame.

In step S508, the processor 130 determines an object window of the moving object according to an image feature in the object feature region associated with the moving object in the current frame. In the embodiments of the disclosure, the object window is an object searching window smaller than the object feature region. For example, the processor 130 finds the object window in the object feature region through the speeded up robust features (SURF) algorithm and the Continuously Adaptive Mean Shift (Camshift) algorithm.

Figure 7:
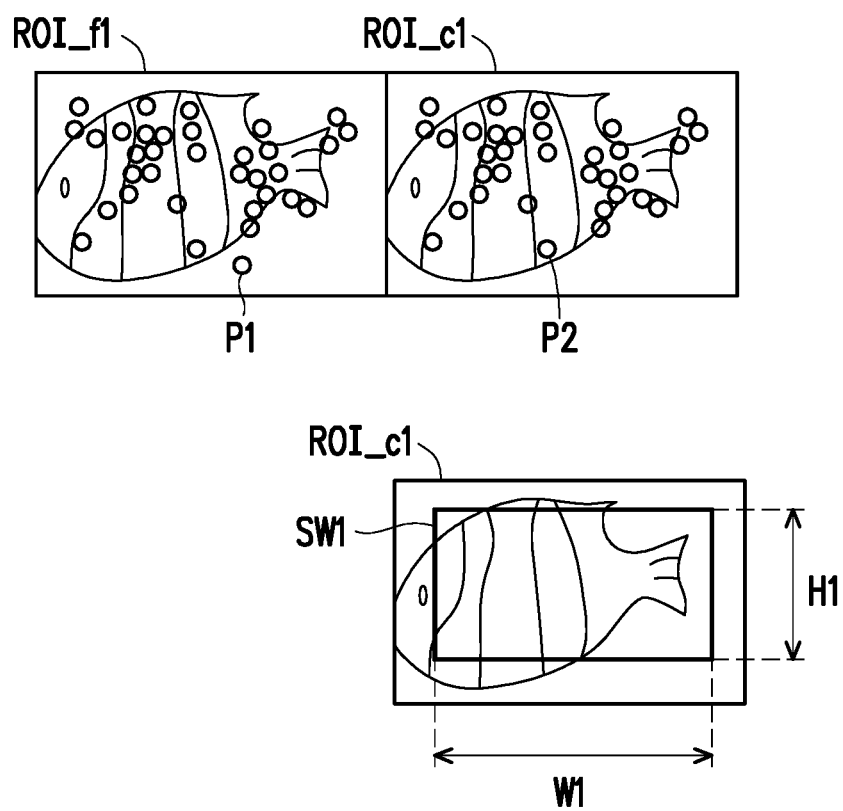
FIG. 7 illustrates an example of generating an object window according to an embodiment of the disclosure.

For example, FIG. 7 illustrates an example of generating an object window according to an embodiment of the disclosure. Referring to FIG. 7, the processor 130 extracts a plurality of feature points (e.g., a feature point P1) in an object feature region ROI_f1 in a previous frame and a plurality of feature points (e.g., a feature point P2) in an object feature region ROI_c1 in a current frame through the SURF algorithm. Next, by comparing the feature points in the object feature region ROI_f1 in the previous frame and the feature points in the object feature region ROI_c1 in the current frame, the processor 130 filters the feature points in the object feature region ROI_c1 in the current frame and retains the correctly matched feature points. Then, the processor 130 finds a region in which the feature points are densely distributed in the object feature region ROI_c1 in the current frame through the Camshift algorithm and accordingly defines an object window SW1.

Figure 8:
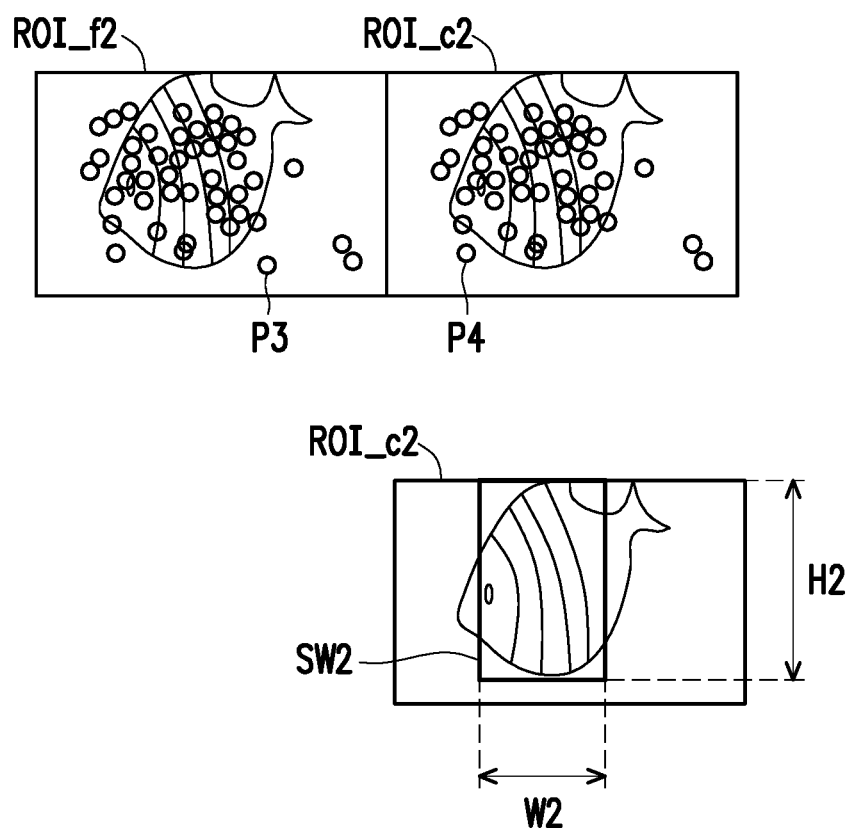
FIG. 8 illustrates an example of generating an object window according to an embodiment of the disclosure.

For example, FIG. 8 illustrates an example of generating an object window according to an embodiment of the disclosure. Referring to FIG. 8, the processor 130 extracts a plurality of feature points (e.g., a feature point P3) in an object feature region ROI_f2 in a previous frame and a plurality of feature points (e.g., a feature point P4) in an object feature region ROI_c2 in a current frame through the SURF algorithm. Next, by comparing the feature points in the object feature region ROI_f2 in the previous frame and the feature points in the object feature region ROI_c2 in the current frame, the processor 130 filters the feature points in the object feature region ROI_c2 in the current frame and retains the correctly matched feature points. Then, the processor 130 finds a region in which the feature points are densely distributed in the object feature region ROI_c2 in the current frame through the Camshift algorithm and accordingly defines an object window SW2.

Afterwards, in step S509, the processor 130 determines whether a width of the object window is greater than a height of the object window. If the determination in step S509 is affirmative, in step S510, the processor 130 determines to maintain the moving posture of the moving object as the movement along the first direction. If the determination in step S509 is negative, it means that the moving object changes the moving posture, and in step S511, the processor 130 adjusts the size of the object feature region associated with the moving object in the current frame.

In the example where the moving object is a fish, in the example shown in FIG. 7, since a width W1 of the object window SW1 is greater than a height H1 of the object window, the processor 130 determines that the moving posture of the fish remains the movement along the first direction. In the example shown in FIG. 8, since a width W2 of the object window SW2 is smaller than a height H2 of the object window, the processor 130 determines that the moving posture of the fish is changed from the movement along the first direction to the movement along the second direction. Furthermore, when the moving posture of the fish is changed from the movement along the first direction to the movement along the second direction, the image of the fish may only occupy a small portion of the unadjusted object feature region. Therefore, when the moving posture of the fish is changed from the movement along the first direction to the movement along the second direction, the processor 130 reduces the size of the object feature region associated with the moving object in the current frame. In the present embodiment, the processor 130 reduces the size of the object feature region to a size identical to the object window and generates an adjusted object feature region and filter out redundant background content. Moreover, in step S512, the processor 130 determines to change the moving posture of the moving object to the movement along the second direction. In other words, when the processor 130 analyzes a next frame of the current frame, the processor 130 will use the second tracking algorithm for performing object tracking.

Then, referring to FIG. 5C, when the processor 130 determines in step S506 that the moving posture of the moving object is the movement along the second direction (namely, the moving posture determined according to the previous frame is the movement along the second direction), in step S513, the processor 130 determines whether the current frame is the first-in frame on which tracking is performed by using the second tracking algorithm. If the determination in step S513 is affirmative, in step S514, the processor 130 performs image subtraction initialization and stores an image content in an object feature region in the current frame as an initial background image. In step S515, the processor 130 determines to maintain the moving posture of the moving object as the movement along the second direction. In detail, the second tracking algorithm performs object tracking according to the motion vector of the moving object, and the motion vector of the moving object requires comparison of image contents of two successive frames. Therefore, if the current frame is the first-in frame on which tracking is performed by using the second tracking algorithm, no object of comparison for the object feature region in the current frame is present, and the motion vector cannot be calculated. Accordingly, if the current frame is the first-in frame on which tracking is performed by using the second tracking algorithm, the processor 130 determines to maintain the moving posture of the moving object as the movement along the second direction and stores the object feature region in the current frame as the initial background image.

If the determination in step S513 is negative, in step S516, the processor 130 generates a pixel difference map by comparing pixels in the object feature region associated with the moving object in the previous frame and pixels in a default region in the current frame and calculates the motion vector of the moving object according to the pixel difference map.

Figure 9:
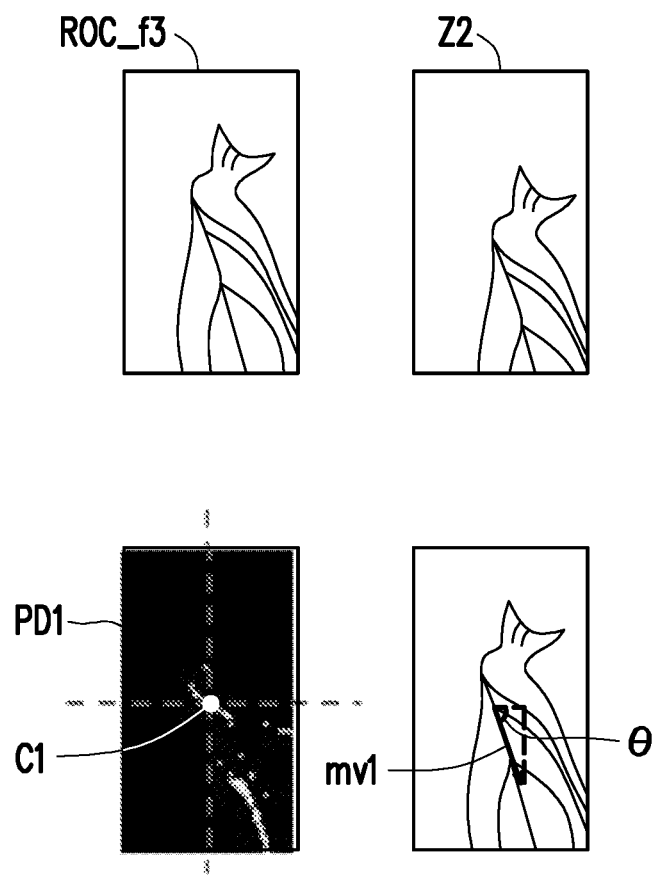
FIG. 9 is a schematic diagram illustrating calculating a motion vector of a moving object according to an embodiment of the disclosure.

For example, FIG. 9 is a schematic diagram illustrating calculating a motion vector of a moving object according to an embodiment of the disclosure. By subtracting pixels in an object feature region ROC_f3 in the previous frame from pixels in a default region Z2 in the current frame, the processor 130 obtains a pixel difference map PD1. A size and a position of the default region Z2 are identical to a size and a position of the object feature region ROC_f3 associated with the moving object in the previous frame. In other words, coordinates of four points of the default region Z2 are identical to coordinates of four points of the object feature region ROC_f3 of the previous frame. Next, using a center C1 of the pixel difference map PD1 as an origin, the processor 130 calculates a coordinate mean value of all pixel differences (i.e., white dots in the pixel difference map PD1) and obtains a motion vector mv1 including a direction of movement and an amount of movement according to the coordinate mean value and the origin.

In step S517, the processor 130 determines whether the direction of movement of the motion vector is within a predetermined range. Specifically, the processor 130 takes the direction of movement of the motion vector as one of the factors for determining whether the moving posture is changed. In the present embodiment, in the example of FIG. 9, the processor 130 calculates a tangent value ($\tan \theta$) of the motion vector according to a horizontal component and a vertical component of the motion vector mv1, and determines whether the direction of movement is within the predetermined range by comparing whether the tangent value is smaller than a predetermined threshold value to thereby recognize the moving posture of the moving object. For example, the predetermined threshold value is $\tan \pm 45°$, but the disclosure is not limited hereto. Alternatively, the processor 130 may first calculate an angle of movement corresponding to the motion vector, and determine whether the direction of movement of the motion vector is within the predetermined range by determining whether the angle of movement is within a predetermined range of angle.

Figure 10:
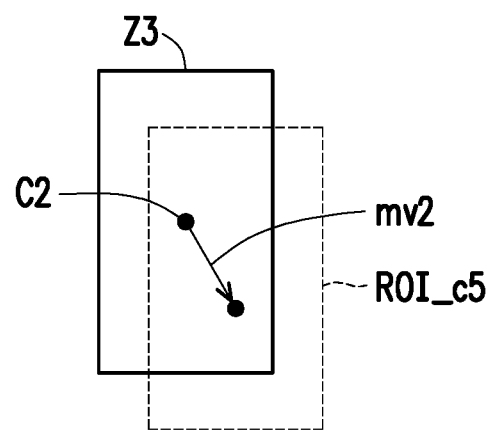
FIG. 10 is a schematic diagram illustrating moving a default region to generate an object feature region according to an embodiment of the disclosure.

Then, if the determination in step S517 is negative, in step S518, the processor 130 adjusts the position of the default region and obtains the object feature region associated with the moving object in the current frame by moving the default region according to the motion vector. In the example where the moving object is a fish, if the determination in step S517 is negative, the processor 130 still classifies the moving posture of the fish as the movement along the second direction (namely, the fish moves forwards and backwards relatively to the image capturing device 110). Accordingly, the processor 130 does not adjust the size of the object feature region, but translationally moves the default region according to the motion vector by taking a center of the object feature region of the previous frame as the origin to thereby obtain the object feature region associated with the moving object in the current frame. For example, referring to FIG. 10, the processor 130 translationally moves a default region Z3 according to a motion vector mv2 by taking a center C2 of the object feature region of the previous frame as the origin and obtains an object feature region ROI_c5 associated with the moving object in the current frame. A size and a position of the default region Z3 are identical to the size and the position of the object feature region associated with the moving object in the previous frame. Next, in step S519, the processor 130 determines to maintain the moving posture of the moving object as the movement along the second direction.

Figure 11:
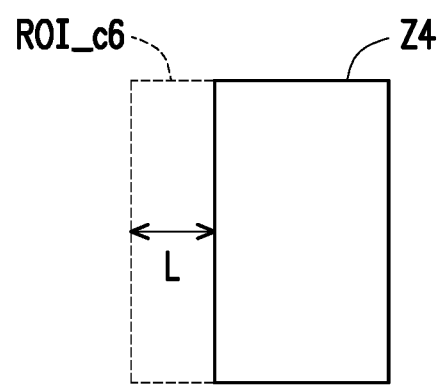
FIG. 11 is a schematic diagram illustrating extending a default region to generate an object feature region according to an embodiment of the disclosure.

If the determination in step S517 is affirmative, in step S520, the processor 130 extends the size of the default region and obtains the object feature region associated with the moving object in the current frame by extending an edge length of the default region according to the amount of movement of the motion vector. For example, referring to FIG. 11, the processor 130 determines an extension length L according to the horizontal component of the motion vector and the type of the moving object, and obtains the object feature region associated with the moving object in the current frame by extending a width of the default region Z4 according to the extension length L. A size and a position of the default region Z4 are identical to the size and the position of the object feature region associated with the moving object in the previous frame.

It is noted that in the course where the movement of the moving object changes from the movement along the second direction to the movement along the first direction, image dimensions of the moving object are gradually increased. By executing step S520, the processor 130 can adequately expand the size of the object feature region in the course where the moving object changes its moving posture, such that the object feature region defined in this period of time can be expanded as the image dimensions of the moving object are gradually increased. Afterwards, in step S521, the processor 130 determines whether the extended edge length of the default region is greater than a standard length of the standard size. The standard size is a standard reference value generated and recorded by executing step S503 and includes a standard length and a standard width of the moving object.

If the determination in step S521 is affirmative, it means that the processor 130 determines that the moving object has changed its moving posture. Therefore, in step S522, the processor 130 updates the object feature region associated with the moving object in the current frame as the standard size. In the example where the moving object is a fish, if the determination in step S521 is affirmative, the processor 130 classifies the moving posture of the fish as the movement along the first direction (namely, the fish moves leftwards and rightwards relatively to the image capturing device 110), and the processor 130 directly updates the object feature region of the current frame as the standard size. In step S523, the processor 130 determines to change the moving posture of the moving object to the movement along the first direction. Conversely, if the determination in step S521 is negative, it means that the processor 130 determines that the moving object has not changed its moving posture. In step S524, the processor 130 determines to maintain the moving posture of the moving object as the movement along the second direction.

By repetitively executing the process of FIG. 5A to FIG. 5C, each frame in the video stream is analyzed as the current frame. The moving posture of the moving object is detected in real time by analyzing each frame, and the position and the size of the object feature region in each frame are also determined and recorded according to the moving posture of the moving object. Accordingly, by analyzing the object feature regions corresponding to different time points, the movement information and position information of the moving object are estimated. Moreover, in the embodiments of the disclosure, the size of the object feature region is dynamically adjusted according to the moving posture of the moving object.

Figure 12:
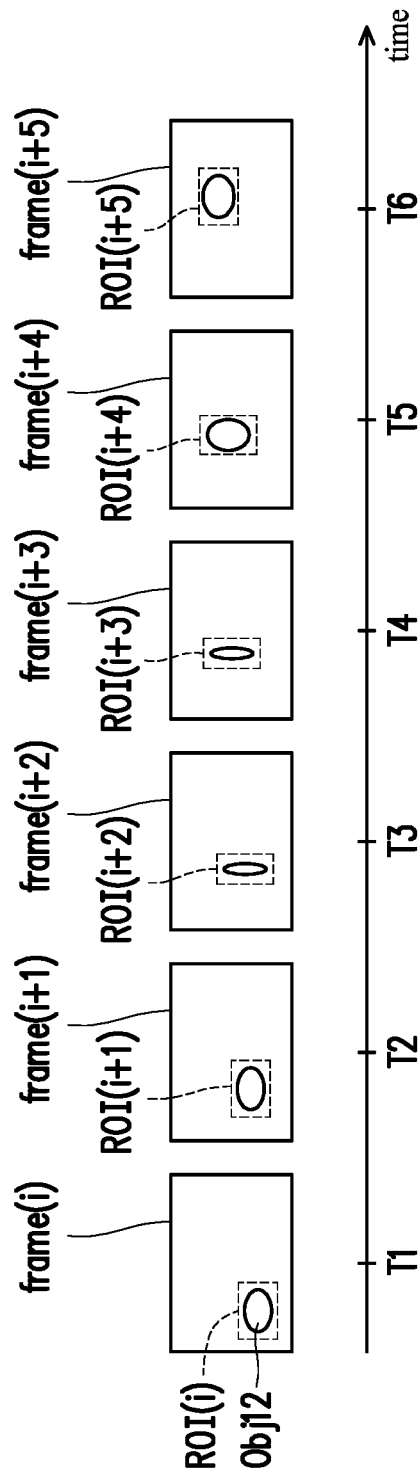
FIG. 12 is a schematic diagram illustrating a scenario of tracking a moving object according to an embodiment of the disclosure.

For example, FIG. 12 is a schematic diagram illustrating a scenario of tracking a moving object according to an embodiment of the disclosure. Referring to FIG. 12, by sequentially analyzing frames frame(i) to frame(i+5) according to the process of FIG. 5A to FIG. 5C, object feature regions ROI(i) to ROI(i+5) associated with a moving object obj12 in the frames frame(i) to frame(i+5) are generated. It is noted that at a time point T3, a moving posture of the moving object obj12 is changed, such that image dimensions of the moving object are reduced. Correspondingly, the image object tracking system of the present embodiment detects the moving posture of the moving object obj12 at the time point T3 in real time and generates the object feature region ROI(i+2) having a smaller size. Moreover, at time points T4 to T6, the moving posture of the moving object obj12 is gradually changed, such that the image dimensions of the moving object are gradually increased. Correspondingly, the image object tracking system of the present embodiment detects the moving posture of the moving object obj12 respectively at the time points T4 to T6 in real time and generates the object feature regions ROI(i+3) to ROI(i+5) having sizes that are incrementally increased. It is particularly noted that in the process of analyzing the frames frame(i) to frame(i+5), the image object tracking system of the present embodiment performs object tracking according to different tracking algorithms.

The embodiments of the disclosure further provide a non-transitory computer-readable medium. The computer-readable medium stores a plurality of program code segments, and the program code segments accomplish the steps in the foregoing image object tracking method after being loaded to and executed by the processor 130 of the image object tracking system 10.

In summary of the above, in the embodiments of the disclosure, the moving posture of the moving object is detected in real time and classified as a movement along a specific direction, so that an adequate tracking algorithm can be selected for performing object tracking based on the moving posture of the moving object. For a moving object having significant postural variations, when image features are lacking due to the posture presented by the moving object, the embodiments of the disclosure can switch to another tracking algorithm that is not based on image features. Therefore, the embodiments of the disclosure use the tracking algorithm that is not based on image features to compensate for the disadvantage that the tracking result may be incorrect due to insufficient image features and provide more accurate tracking results for a moving object having greater formal variations. Moreover, based on the positions of the object feature region in the frames, the movement statuses and positions of the moving object can be accurately tracked, which facilitates analysis on mobility or other characteristics of the moving object according to the tracking results and facilitates embedding object label information of the moving object in the image of the video stream by using the tracking results. In addition, compared to tracking based on a fixed ROI size, the embodiments of the disclosure flexibly adjust the size of the ROI according to the moving posture of the moving object and thereby enhance precision of tracking.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. An image object tracking method for tracking a moving object, the method comprising:
    receiving a video stream comprising a previous frame and a current frame, wherein the video stream is generated through photographing a space comprising the moving object by an image capturing device;
    obtaining a moving posture of the moving object in the previous frame;
    determining whether the moving posture of the moving object in the previous frame is a movement along a first direction or a movement along a second direction, wherein the first direction is different from the second direction;
    selecting a corresponding tracking algorithm from a first tracking algorithm and a second tracking algorithm according to the determination of whether the moving posture of the moving object in the previous frame is the movement along the first direction corresponding to the first tracking algorithm or the movement along the second direction corresponding to the second tracking algorithm;
    performing the selected corresponding tracking algorithm to obtain an object feature region associated with the moving object in the current frame according to the determination of whether the moving posture of the moving object in the previous frame is the movement in the first or the second direction, wherein the first tracking algorithm is different from the second tracking algorithm; and
    tracking the moving object in the space according to the object feature region.

2. The image object tracking method according to claim 1, wherein when the previous frame is a first-in frame of the video stream, the step of obtaining the moving posture of the moving object according to the previous frame comprises:
    recognizing the moving object from the first-in frame and generating an object feature region associated with the recognized moving object in the first-in frame; and
    initially setting the moving posture of the moving object as the movement along the first direction or the movement along the second direction by comparing a width and a height of the object feature region in the first-in frame.

3. The image object tracking method according to claim 1, wherein the step of selecting the corresponding tracking algorithm from the first tracking algorithm and the second tracking algorithm according to the determination of whether the moving posture of the moving object in the previous frame is the movement along the first direction corresponding to the first tracking algorithm or the movement along the second direction corresponding to the second tracking algorithm to obtain the object feature region associated with the moving object in the current frame comprises:
    selecting the first tracking algorithm for performing image feature comparison to obtain the object feature region associated with the moving object in the current frame, if the moving posture of the moving object is the movement along the first direction; and
    selecting the second tracking algorithm for calculating a motion vector of the moving object to obtain the object feature region associated with the moving object in the current frame, if the moving posture of the moving object is the movement along the second direction.

4. The image object tracking method according to claim 3, wherein the step of selecting the first tracking algorithm for performing image feature comparison to obtain the object feature region associated with the moving object in the current frame if the moving posture of the moving object is the movement along the first direction comprises:
    searching in the current frame according to an image feature in the object feature region associated with the moving object in the previous frame to thereby determine a position of the object feature region associated with the moving object in the current frame.

5. The image object tracking method according to claim 4, wherein the step of selecting the first tracking algorithm for performing image feature comparison to obtain the object feature region associated with the moving object in the current frame if the moving posture of the moving object is the movement along the first direction further comprises:
    determining an object window according to an image feature in the object feature region associated with the moving object in the current frame; and
    comparing a width and a height of the object window to determine whether to adjust a size of the object feature region associated with the moving object in the current frame and determine whether to change the moving posture of the moving object to the movement along the second direction.

6. The image object tracking method according to claim 3, wherein the step of selecting the second tracking algorithm for calculating the motion vector of the moving object to obtain the object feature region associated with the moving object in the current frame if the moving posture of the moving object is the movement along the second direction comprises:
    generating an image difference map by comparing pixels in the object feature region associated with the moving object in the previous frame and pixels in a default region in the current frame, and calculating the motion vector of the moving object according to the image difference map, wherein a size and a position of the default region are identical to a size and a position of the object feature region associated with the moving object in the previous frame, and the motion vector comprises a direction of movement and an amount of movement.

7. The image object tracking method according to claim 6, wherein the step of selecting the second tracking algorithm for calculating the motion vector of the moving object to obtain the object feature region associated with the moving object in the current frame if the moving posture of the moving object is the movement along the second direction further comprises:
adjusting the position of the default region and obtaining the object feature region associated with the moving object in the current frame by moving the default region according to the motion vector, if the direction of movement of the motion vector is within a predetermined range.

8. The image object tracking method according to claim 6, wherein the step of selecting the second tracking algorithm for calculating the motion vector of the moving object to obtain the object feature region associated with the moving object in the current frame if the moving posture of the moving object is the movement along the second direction further comprises:
extending the size of the default region and obtaining the object feature region associated with the moving object in the current frame by extending an edge length of the default region according to the amount of movement of the motion vector, if the direction of movement of the motion vector is not within a predetermined range.

9. The image object tracking method according to claim 8, wherein the step of selecting the second tracking algorithm for calculating the motion vector of the moving object to obtain the object feature region associated with the moving object in the current frame if the moving posture of the moving object is the movement along the second direction further comprises:
determining whether the extended edge length of the default region is greater than a standard length;
determining to maintain the moving posture of the moving object as the movement along the second direction, if the extended edge length of the default region is not greater than the standard length; and
determining to change the moving posture of the moving object to the movement along the first direction and updating the object feature region associated with the moving object in the current frame as a standard size, if the extended edge length of the default region is greater than the standard length.

10. The image object tracking method according to claim 1, wherein the moving object comprises a fish.

11. The image object tracking method according to claim 1, wherein the moving posture of the moving object in the previous frame is recorded as an index tag, and whether the moving posture of the moving object in the previous frame is the movement along a first direction or the movement along a second direction is determined by reading the index tag.

12. An image object tracking system comprising:
an image capturing device configured to photograph a space comprising a moving object to generate a video stream;
a storage device configured to store data; and
a processor coupled to the image capturing device and the storage device and configured to:
receive the video stream comprising a previous frame and a current frame;
obtain a moving posture of the moving object in the previous frame;
determine whether the moving posture of the moving object in the previous frame is a movement along a first direction or a movement along a second direction, wherein the first direction is different from the second direction;
select a corresponding tracking algorithm from a first tracking algorithm and a second tracking algorithm according to the determination of whether the moving posture of the moving object in the previous frame is the movement along the first direction corresponding to the first tracking algorithm or the movement along the second direction corresponding to the second tracking algorithm;
perform the selected corresponding tracking algorithm to obtain an object feature region associated with the moving object in the current frame according to the determination of whether the moving posture of the moving object in the previous frame is the movement in the first or the second direction, wherein the first tracking algorithm is different from the second tracking algorithm; and
track the moving object in the space according to the object feature region.

13. The image object tracking system according to claim 12, wherein when the previous frame is a first-in frame in the video stream, the processor recognizes the moving object from the first-in frame and generates an object feature region associated with the recognized moving object in the first-in frame,
wherein the processor initially sets the moving posture of the moving object as the movement along the first direction or the movement along the second direction by comparing a width and a height of the object feature region in the first-in frame.

14. The image object tracking system according to claim 12, wherein the processor selects the first tracking algorithm for performing image feature comparison to obtain the object feature region associated with the moving object in the current frame, if the moving posture of the moving object is the movement along the first direction,
wherein the processor selects the second tracking algorithm for calculating a motion vector of the moving object to obtain the object feature region associated with the moving object in the current frame, if the moving posture of the moving object is the movement along the second direction.

15. The image object tracking system according to claim 14, wherein the processor searches in the current frame according to an image feature in the object feature region associated with the moving object in the previous frame to thereby determine a position of the object feature region associated with the moving object in the current frame.

16. The image object tracking system according to claim 15, wherein the processor determines an object window according to an image feature in the object feature region associated with the moving object in the current frame, and compares a width and a height of the object window to determine whether to adjust a size of the object feature region associated with the moving object in the current frame and determine whether to change the moving posture of the moving object to the movement along the second direction.

17. The image object tracking system according to claim 14, wherein the processor generates an image difference map by comparing pixels in the object feature region associated with the moving object in the previous frame and pixels in a default region in the current frame, and calculates the motion vector of the moving object according to the image difference map, wherein a size and a position of the default region are identical to a size and a position of the object feature region associated with the moving object in the previous frame, and the motion vector comprises a direction of movement and an amount of movement.

18. The image object tracking system according to claim 17, wherein the processor adjusts the position of the default region and obtains the object feature region associated with the moving object in the current frame by moving the default region according to the motion vector, if the direction of movement of the motion vector is within a predetermined range.

19. The image object tracking system according to claim 17, wherein the processor extends the size of the default region and obtains the object feature region associated with the moving object in the current frame by extending an edge length of the default region according to the amount of movement of the motion vector, if the direction of movement of the motion vector is not within a predetermined range.

20. The image object tracking system according to claim 19, wherein the processor determines whether the extended edge length of the default region is greater than a standard length, wherein the processor maintains the moving posture of the moving object as the movement along the second direction, if the extended edge length of the default region is not greater than the standard length, wherein the processor determines to change the moving posture of the moving object to the movement along the first direction and update the object feature region associated with the moving object in the current frame as a standard size, if the extended edge length of the default region is greater than the standard length.

21. The image object tracking system according to claim 12, wherein the moving object comprises a fish.

22. A computer-readable recording medium recording computer programs, loaded by a processor of an image object tracking system to execute steps below:

receiving a video stream comprising a previous frame and a current frame, wherein the video stream is generated through photographing a space comprising a moving object by an image capturing device;

obtaining a moving posture of the moving object in the previous frame;

determining whether the moving posture of the moving object in the previous frame is a movement along a first direction or a movement along a second direction, wherein the first direction is different from the second direction;

selecting a corresponding tracking algorithm from a first tracking algorithm and a second tracking algorithm according to the determination of whether the moving posture of the moving object in the previous frame is the movement along the first direction corresponding to the first tracking algorithm or the movement along the second direction corresponding to the second tracking algorithm;

performing the selected corresponding tracking algorithm to obtain an object feature region associated with the moving object in the current frame according to the determination of whether the moving posture of the moving object in the previous frame is the movement in the first or the second direction, wherein the first tracking algorithm is different from the second tracking algorithm; and tracking the moving object in the space according to the object feature region.

* * * * *